United States Patent
Wirth et al.

(10) Patent No.: US 7,775,039 B2
(45) Date of Patent: Aug. 17, 2010

(54) PROCEDURE TO OPERATE A PARTICLE FILTER DISPOSED IN AN EXHAUST GAS AREA OF AN INTERNAL COMBUSTION ENGINE AND DEVICE TO IMPLEMENT THE PROCEDURE

(75) Inventors: Ralf Wirth, Farmington Hills (DE);
Carsten Becker, Kernen I.R. (DE);
Hartmut Lueders, Oberstenfeld (DE);
Andreas Fritsch, Waiblingen (DE);
Stefan Motz, Moeglingen (DE); Paolo Ciccarese, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 713 days.

(21) Appl. No.: 11/712,740

(22) Filed: Mar. 1, 2007

(65) Prior Publication Data
US 2007/0261392 A1 Nov. 15, 2007

(30) Foreign Application Priority Data
Mar. 3, 2006 (DE) .................. 10 2006 009 921

(51) Int. Cl.
*F01N 3/00* (2006.01)
(52) U.S. Cl. .................. 60/295; 60/274; 60/286; 60/297; 60/303
(58) Field of Classification Search .................. 60/274, 60/285, 286, 295, 297, 303, 311
See application file for complete search history.

(56) References Cited

U.S. PATENT DOCUMENTS 6,405,528 B1 * 6/2002 Christen et al. .............. 60/295
7,111,455 B2 * 9/2006 Okugawa et al. ............ 60/295
7,171,803 B2 * 2/2007 Saito et al. .................. 60/297
7,310,941 B2 * 12/2007 Kuboshima et al. .......... 60/297
7,313,913 B2 * 1/2008 Okugawa et al. ............ 60/295
7,441,403 B2 * 10/2008 Sun et al. .................... 60/295

FOREIGN PATENT DOCUMENTS

| DE | 101 08 720 A1 | 9/2002 |
|---|---|---|
| DE | 103 33 441 A1 | 2/2004 |
| DE | 102 48 431 A1 | 4/2004 |
| DE | 10 2004 031 321 A1 | 1/2006 |
| EP | 1 130 227 A1 | 9/2001 |

* cited by examiner

*Primary Examiner*—Binh Q Tran
(74) *Attorney, Agent, or Firm*—Merchant & Gould P.C.

(57) ABSTRACT

A procedure to operate a particle filter disposed in an exhaust gas area of an internal combustion engine and a device to implement the procedure are proposed. The particle filter is regenerated if required by the particles lodged in the filter, whereby the particle filter is heated for regeneration by manipulation of the exhaust gas temperature upstream in front of the particle filter. During the regeneration of the particle filter, the exhaust gas temperature is established to a specified exhaust gas temperature set point, which is dependent upon at least one parameter of the particle filter during the regeneration. The procedural approach according to the invention allows for a quick regeneration of the particle filter without endangering the particle filter with an inadmissibly high temperature.

10 Claims, 2 Drawing Sheets

Figure 1:
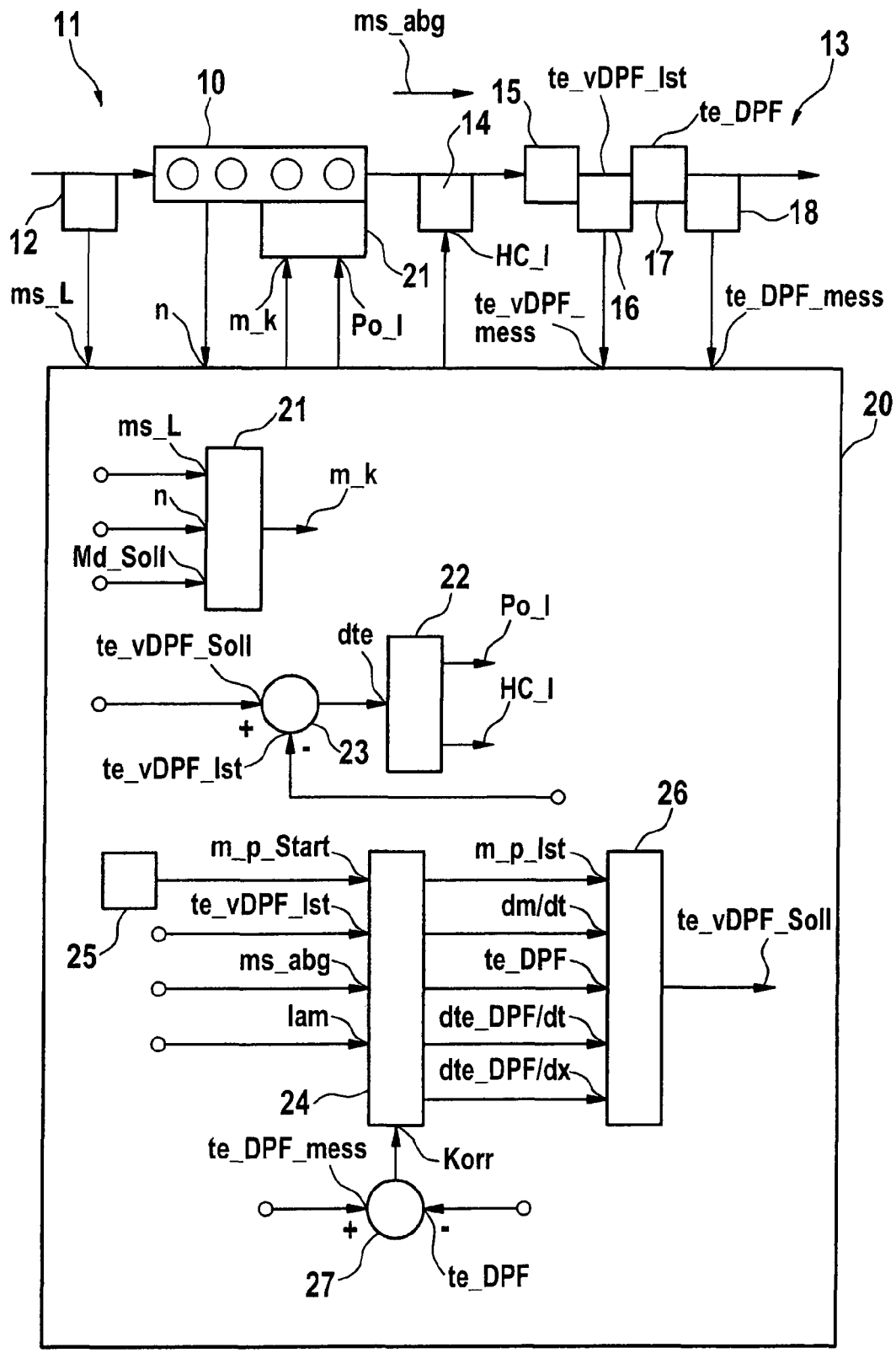

PROCEDURE TO OPERATE A PARTICLE FILTER DISPOSED IN AN EXHAUST GAS AREA OF AN INTERNAL COMBUSTION ENGINE AND DEVICE TO IMPLEMENT THE PROCEDURE

The invention proceeds from a procedure to operate a particle filter disposed in the exhaust gas area of the internal combustion engine and from a device to implement the procedure according to the class of the independent claims.

The regeneration of a particle filter results from a burning out of the particles lodged in the particle filter, which begins without a conditioning of the particles from a temperature of approximately 550° C. and upwards. From the German patent DE 101 08 720 A1, a procedure and a device to operate a particle filter disposed in the exhaust gas area of an internal combustion engine have been made known. They proceed from at least one operating parameter, which indicates the condition of the internal combustion engine and/or the condition of the particle filter, and determine from this operating parameter a parameter, which describes the intensity of the burnout of the particles. The parameter is compared with a threshold value. If the threshold value is exceeded, steps are introduced to reduce the speed of the reaction in order to prevent an overheating of the particle filter. These steps target interventions which reduce the oxygen content in the exhaust gas.

In the German patent DE 103 33 441 A1 a regeneration of a particle filter is described, which is disposed in the exhaust gas area of an internal combustion engine. In the particle filter provision is made for a closed-loop control to a specified set point or to a revisional set point, whereby the set point or the revisional set point is specified in a way that an undesirably high thermal release due to the oxidation of the particles lodged in the particle filter is avoided.

In the German patent DE 102 48 431 A1 a procedure to ascertain the degree of depletion of a particle filter is described, which is dependent upon the determination of a parameter characterizing the flow resistance of the particle filter based upon the temperature in the particle filter and the pressure in the particle filter. From the parameter determined in this way, a conclusion can be drawn about the degree of depletion of the particle filter.

From the patent EP 1 130 227 A1 a system to support the regeneration of a particle filter disposed in an exhaust gas area of an internal combustion engine has been made known, in which the exhaust gas temperature to start and maintain the regeneration of the particle filter is raised by the introduction of hydrocarbons into the exhaust gas area. The exhaust gas temperature is measured upstream in front of an oxidation catalytic converter, downstream behind a particle filter disposed adjacent to the oxidation catalytic converter as well as between the oxidation catalytic converter and the particle filter. The starting point is an exhaust gas temperature set point, for example, 550° C., to which the particle filter must be brought in order to induce the regeneration. The elevation of the exhaust gas temperature results essentially from at least one fuel after-injection into the internal combustion engine, which leads to an increased HC-proportion in the exhaust gas, which reacts exothermically in the oxidation catalytic converter. The fuel after-injections are maintained at least as long as it takes to maintain the specified exhaust gas temperature set point.

In the German patent DE 10 2004 031 321 A1 a procedure to meter a fuel into an exhaust gas duct of an internal combustion engine and a device to implement the procedure are proposed, in which the fuel is supposed to be implemented in an exothermic reaction to achieve a specified set point temperature of a component, which is to be heated, or at least an exhaust gas temperature set point upstream in front of the component to be heated. The required metered amount of the fuel is calculated using a model of the exothermic reaction. The described procedural approach allows for the achievement of the specified temperature set point with a minimal metering of the fuel. An excessive metering is avoided.

The task underlying the invention is to indicate a procedure of a particle filter disposed in the exhaust gas area of an internal combustion engine and a device to implement the procedure, which allows for a quick regeneration of the particle filter without the danger of overheating. The task is solved in each case by the characteristics listed in the independent claims.

Provision is made in the procedure according to the invention to operate a particle filter disposed in the exhaust gas area of an internal combustion engine so that the exhaust gas temperature upstream in front of the particle filter is established at a specified exhaust gas temperature set point and that the exhaust gas temperature set point is a function of a parameter of the particle filter during the regeneration. In so doing, the particle filter if need be is regenerated from the particles lodged in the filter, and the particle filter is heated for regeneration by influencing the exhaust gas temperature upstream in front of the particle filter.

Provision is made in the procedural approach according to the invention to establish the exhaust gas temperature upstream in front of the particle filter to an exhaust gas temperature set point not only to initiate the regeneration of the particle filter but also to be maintained ongoing during the regeneration. The exhaust gas temperature upstream in front of the particle filter can by way of comparison be set exactly to the specified exhaust gas temperature set point with the means available in the state of the art mentioned at the beginning of the application.

Provision is made, for example, to introduce a reagent substance capable of being oxidized into the exhaust gas area of the internal combustion engine upstream in front of the particle filter. The reagent substance reacts, for example, exothermally on a catalytically active surface to supply the thermal energy. The exhaust gas temperature resulting from the exothermic reaction can then be ascertained according to the procedural approach which can be extracted from the state of the art mentioned at the beginning of the application. Provided that provision has been made for it, the exhaust gas temperature actual value can, for example, by way of comparison be simply ascertained using an exhaust gas temperature model or using a measurement.

It is essential for the invention that at least one parameter of the particle filter is taken into consideration during the regeneration for the establishment of an exhaust gas temperature set point. Such parameters are, for example, the amount of particles lodged in the particle filter, respectively particle mass, for example, the rate of change, respectively particle burnout speed, for example, the particle filter temperature, for example, the particle filter temperature rate of change or, for example, the particle filter temperature gradient.

The procedural approach according to the invention allows for an exact adaptation of the heat energy made available to the actual amount of heat energy required. In particular the procedural approach on the one hand prevents an excessive temperature harmful to the particle filter and provides on the other hand for the maintenance of the regeneration, so that the regeneration can be quickly concluded. The regeneration of the particle filter occurs, therefore, in an energy efficient manner.

Advantageous modifications and embodiments of the procedural approach according to the invention result from the dependent claims.

Provision is made in the embodiments to take into account at least one of the previously mentioned parameters used as an example for the establishment of an exhaust gas temperature set point.

Provision is made in an especially advantageous embodiment to ascertain a measurement for the parameter in a characteristic model. With this action a metrological acquirement of at least one parameter of the particle filter can be dispensed with during the regeneration. The characteristic model is particularly a particle burnout model, in which the reaction processes, respectively the reaction kinetics, of the reaction partners involved are taken into account.

Provision is made in modifications of this embodiment for the characteristic model to take into account a measurement for the exhaust gas temperature actual value upstream in front of the particle filter and/or a measurement for the exhaust gas flow of the internal combustion engine and/or a measurement for the oxygen concentration in the exhaust gas. The aforementioned dimensions influence significantly on the one hand the parameter, of which there is at least one, and are by comparison on the other hand metrologically easy to ascertain using in each case a model.

Provision is made in one embodiment to ascertain a correction value to correct the characteristic model from a comparison of one measurement ascertained from the characteristic model for the particle temperature and a measured particle filter temperature. The adaptation of the characteristic model allows for a precise calibration of the characteristic model to the processes actually taking place in the particle filter during the reaction and allows especially for a compensation for the long term influences.

The device according to the invention to operate a particle filter disposed in the exhaust gas area of an internal combustion engine concerns initially a control device, which is specially manufactured to implement the procedure.

The control device contains preferably at least one electrical storage unit, in which the procedural steps are deposited as a computer program.

Provision is made in one embodiment of the device for a temperature sensor to acquire the actual value of the exhaust gas temperature upstream in front of the particle filter. With this step a simple closed-loop control of the exhaust gas temperature upstream in front of the particle filter to the specified set point of the exhaust gas temperature is possible.

Additional advantageous modifications and embodiments of the procedural approach according to the invention result from the additional dependent claims and from the following description.

DRAWINGS

Figure 2:
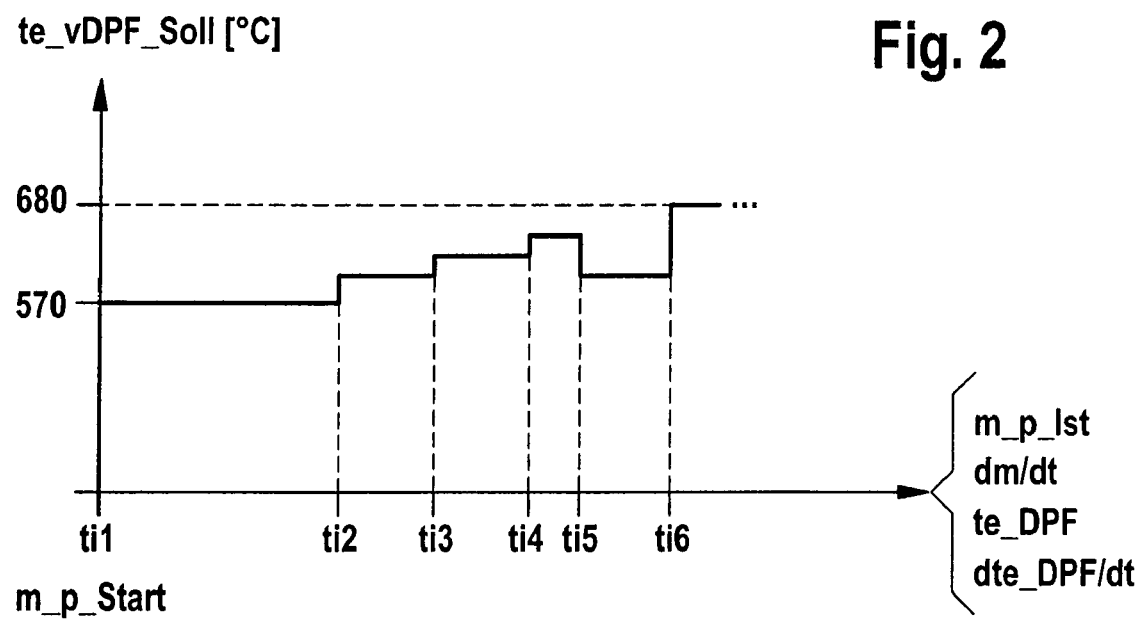

FIG. 1 shows a technical layout, in which a procedure according to the invention is operating including a functional block diagram, and FIG. 2 shows a chronological progression of an exhaust gas temperature set point as a function of at least one parameter of a particle filter during the regeneration.

FIG. 1 shows an internal combustion engine 10, in whose air intake area 11 an air ascertainment 12 and in whose exhaust gas area 13 a reagent substance introduction 14, a catalytic converter 15, a first temperature sensor 16, a particle filter 17 as well as a second temperature sensor 18 are disposed.

In the exhaust gas area 13 an exhaust gas flow ms_abg occurs; upstream in front of the particle filter 17, an exhaust gas temperature actual value te_vDPF_Ist occurs; and in the particle filter 17 a particle filter temperature te_DPF occurs.

The air ascertainment 12 provides an air signal ms_L to a control device 20; the internal combustion engine 10 provides an engine rotational speed n; the first temperature sensor 16 provides a first exhaust gas temperature measurement value te_vDPF; and the second temperature sensor 18 provides a second exhaust gas temperature measurement value te_DPF_mess.

The control device 20 provides a fuel signal m_K as well as a fuel-after-injection signal Po_I to the fuel metering 21 and a reagent substance signal HC_I to the reagent substance introduction 14.

The control device 20 contains a fuel signal establishment 21, to which the air signal ms_L, the engine rotational speed n and a torque set point Md_Soll are provided and which supplies the fuel signal m_K.

The control device 20 contains additionally a temperature regulator 22, which is provided with a temperature differential dte and which supplies the fuel after-injection signal Po_I and the reagent substance signal HC_I.

The temperature differential dte ascertains a first summing agent 23 from an exhaust gas temperature set point te_vDPF_Soll and the exhaust gas temperature actual value te_vDPF_Ist.

The control device 20 contains additionally a characteristic model 24, which is provided with a particle starting value m_P_Start supplied by a degree of depletion ascertainment 25, the exhaust gas temperature actual value te_vDPF_Ist, the exhaust gas flow ms_abg as well as an oxygen concentration lam, and supplies a particle depletion mass m_p_Ist, a particle rate of change dm/dt, a particle filter temperature te_DPF, a particle filter temperature rate of change dte_DPF/dt as well as a particle filter temperature gradient dte_DPF/dx.

The particle depletion mass m_p_Ist, the particle rate of change dm/dt, the particle filter temperature te_DPF, the particle filter temperature rate of change dte_DPF/dt and the particle filter temperature gradient dte_DPF/dx are provided to an exhaust gas temperature set point establishment 26, which provides the exhaust gas temperature set point te_vDPF_Soll.

A second summing agent 27 ascertains a correction value Korr from the second temperature measurement value te_DPF_mess and from the particle filter temperature te_DPF supplied by the characteristic model 24. This correction value Korr is then supplied to the characteristic model 24.

FIG. 2 shows a connection between the particle depletion mass m_p_Ist, the particle rate of change dm/dt, the particle filter temperature te_DPF as well as the particle filter temperature rate of change dte_DPF/dt and the exhaust gas temperature set point te_vDPF_Soll at different points in time ti1, ti2, ti3, ti4, ti5, and ti6. At the first point in time ti1, the particle starting value m_P_Start is present and the exhaust gas temperature set point te_vDPF_Soll is established at a temperature starting value (570° C.). At the sixth point in time ti6, the exhaust gas temperature set point te_vDPF_Soll rises to a temperature high value (680° C.).

The procedure according to the invention works in the following manner:

The fuel signal establishment 21 ascertains the fuel signal m_K as a function of the air signal ms_L, the engine rotational speed n and the torque set point Md_Soll. The air signal ms_L is a measurement for the air intake of the internal combustion engine 10, whereby the air mass or the amount of air is concerned. The torque set point Md_Soll is derived from the position of an unspecified accelerator pedal and a likewise unspecified motor vehicle, in which the internal combustion engine is deployed as the driving motor. The fuel signal m_K is provided to the fuel metering 21, which meters the specified amount of fuel at a specified point in time to the individual cylinders of the internal combustion engine 10.

The particle filter 17 is disposed in the exhaust gas area 13 of the internal combustion engine 10, which is regenerated according to need by the particles lodged within it. Without conditioning of the particles and with, for example, a fuel additive, the ignition temperature for the particle burnout lies at approximately 550° C. The exhaust gas temperature set point m_p_Ist is to be established at this temperature starting value for the starting of the regeneration. In the depicted example of embodiment according to FIG. 2, the temperature starting value is, for example, at 570° C.

Provision is made for a heating of the particle filter 17 by a targeted manipulation of the exhaust gas temperature te_vDPF_Ist upstream in front of the particle filter 17. The manipulation can take place in such a way that a reagent substance capable of being oxidized is introduced into the exhaust gas area 13 upstream in front of the particle filter 17, whereby the reagent substance reacts exothermally with the oxygen present in the exhaust gas area 13. Provision can be made, for example, for gas to be the reagent substance capable of oxidation.

The fuel can, for example, be supplied by at least one fuel after-injection. The magnitude of the amount of the fuel after-injection as well as the point in time is conveyed to the fuel metering 21 by the fuel after injection signal Po_I. Alternatively or additionally provision can be made for the immediate introduction of the reagent substance capable of oxidation into the exhaust gas area 13 via the reagent substance introduction 14. The magnitude of the amount to be introduced and the point in time are conveyed to the reagent substance introduction 14 by way of the reagent substance signal HC_I.

The reagent substance reacts, for example, on a catalytically active surface, which in the depicted example of embodiment has been provided for as a catalytic converter 15 in the exhaust gas area 13. In regard to the catalytic converter 15, it can be in the form of an oxidation catalytic converter which is separated from the particle filter 17. If need be, the catalytic converter can structurally be joined with the particle filter 17. A measured quantity for the heat flow volume, respectively for the resulting exhaust gas temperature actual value te_vDPF_Ist, can be maintained according to the state of the art mentioned at the beginning of the application using the known dosage of the reagent substance introduced into the exhaust gas area 13 and a measurement for the oxygen concentration lam in the exhaust gas area, whereby the oxygen concentration lam, for example, can be ascertained with an unspecified lambda sensor or using a model.

Provision is made preferably for the first temperature sensor 16 to acquire the exhaust gas temperature actual value te_vDPF_Ist, which provides the first temperature measurement value te_vDPF_mess as a measurement for the exhaust gas temperature actual value te_vDPF_Ist upstream in front of the particle filter 17 to the control device 20.

Preferably the exhaust gas temperature set point te_vDPF_Soll is set to a specified value by means of a closed-loop control. The temperature regulator 22 establishes the fuel after-injection signal Po_I and/or the reagent substance signal HC_I within the scope of a closed-loop control, which if need be is provided, as a function of the temperature differential dte, which the first summing agent 23 supplies as the difference between the specified exhaust gas temperature set point te_vDPF_Soll and the exhaust gas temperature actual value te_vDPF_Ist.

The exhaust gas temperature actual value te_vDPF_Ist can be calculated using an exhaust gas temperature model or preferably measured with the first temperature sensor 16.

The exhaust gas temperature set point te_vDPF_Soll upstream in front of the particle filter 17 is established by the exhaust gas temperature set point establishment 26 as a function of at least one parameter of the particle filter 17 during the regeneration. In the depicted example of embodiment, provision is made for at least a measurement for the particle degree of depletion m_p_Ist and/or at least a measurement for the particle mass-rate of change dm/dt and/or at least a measurement for the particle filter temperature te_DPF and/or at least a measurement for the particle filter temperature rate of change dte_DPF/dt and/or at least a measurement for the particle filter temperature gradient dte_DPF/dx to be the parameter.

In principle at least one of the following parameters could be measured m_p_Ist, dm/dt, te_DPF, dte_DPF/dt, dte_DPF/dx. Provision can be made for the particle filter temperature te_DPF to be measured by the second temperature sensor 18, which provides the second temperature measurement signal te_DPF_mess to the control device 20 as a measurement for the particle filter temperature te_DPF.

In the example of embodiment shown at least one of the parameters: m_p_Ist, dm/dt, te_DPF, dte_DPF/dt, dte_DPF/dx preferably is ascertained with the parameter model 24 from existing known magnitudes instead of a measurement value.

In the example of embodiment shown, the characteristic model 24 takes into account at least one measurement for the particle starting value m_P_Start, which indicates the particle amount or the particle mass, which is lodged in the particle filter 17 at the beginning of the regeneration. The particle starting value m_P_Start is provided by the degree of depletion ascertainment 25, which, for example, is described in detail in the state of the art mentioned at the beginning of the application.

Additionally at least one measurement for the exhaust gas temperature actual value te_vDPF_Ist is preferably taken into account. In addition, preferably at least one measurement for the exhaust gas flow ms_abg is taken into account, which is the exhaust gas mass flow or the exhaust gas volume flow. Furthermore, a measurement for the oxygen concentration lam, for example a lambda signal, is preferably taken into account.

The characteristic model 24 takes into account the reaction kinetics of the reaction partners which are involved. As reaction partners the particles, which primarily consist of hydrocarbons as well as oxygen, are available. The characteristic model 24 can especially be considered a particle burn out model. The particle filter temperature te_DPF ascertained as well as the particle mass rate of change will be all the higher, the higher the particle starting value m_P_Start, the higher the exhaust gas temperature actual value te_vDPF_Ist, the lower the exhaust gas flow ms_abg and the higher the oxygen concentration lam is.

The particle actual value m_p_Ist, which, for example, reflects the particle number or the particle mass, can, for example, be obtained from an integration of the particle rate of change. The particle filter temperature rate of change dte_DPF/dt can be obtained from a chronological derivation of the particle filter temperature te_DPF. The knowledge of the particle filter structure is required to ascertain the particle filter temperature gradient dte_DPF/dx.

A monitoring, respectively a correction of the characteristic model 24, is possible with at least the one correction value Korr, which the summing agent 27 supplies as the difference between the second temperature measurement value te_DPF_mess, which reflects a measurement for the particle filter temperature te_DPF, and the particle filter temperature te_DPF ascertained from the characteristic model.

FIG. 2 shows a possible chronological progression of an establishment of the exhaust gas temperature set point te_vDPF_Soll as a function of at least one of the parameters: m_p_Ist, dm/dt, te_DPF, dte_DPF/dt, dte_DPF/dx.

The exhaust gas temperature set point te_vDPF_Soll begins at the first point in time ti1, at which the particle starting value m_P_Start is present with a specification of the temperature starting value at, for example, 570° C., however at least at 550° C., which is the lowest starting temperature for the particle burn out. Provided an additive is mixed in with the fuel of the internal combustion engine 10, the lowest starting temperature sinks, for example, to 400° C.

At the second, third and fourth point in time ti2, ti3, ti4, provision is made in each case for an elevation of the exhaust gas temperature set point te_vDPF_Soll. As a result, for example, of an ominous, unreliably high particle filter temperature te_DPF, which the characteristic model 24 ascertains before the fifth point in time ti5, the exhaust gas temperature set point te_vDPF_Soll is lowered at the fifth point in time ti5.

At the sixth point in time ti6, the exhaust gas temperature set point te_vDPF_Soll is raised to the temperature high value, for example 680° C., which is supposed to correspond to the maximum specification value in the depicted example of embodiment.

Instead of the intermittent temperature changes shown in FIG. 2, provision can be made for a continuous progression of the exhaust gas temperature set point te_vDPF_Soll, which is to be specified.

The invention claimed is:

1. A method of regenerating a particle filter disposed in an exhaust gas area of an internal combustion engine, the method comprising:
heating the particle filter for regeneration by manipulating an exhaust gas temperature upstream of the particle filter, wherein the exhaust gas temperature is brought to a specified exhaust gas temperature set point selected as one of a step progression comprising intermittent changes to the exhaust gas temperature set point and a continuous progression comprising continuous changes to the exhaust gas temperature set point, and wherein the exhaust gas temperature set point is a function dependent upon at least one parameter of the particle filter during the regeneration.

2. A method according to claim 1, wherein provision is made for at least one of: a measurement of a lodged particle mass; and a measurement for a particle rate of change to be the at least one parameter.

3. A method according to claim 1, wherein provision is made for at least one of: a measurement of a particle filter temperature; a measurement of a particle filter temperature rate of change; and a measurement for a particle filter temperature gradient to be the at least one parameter.

4. A method according to claim 1, further comprising manipulating the exhaust gas temperature set point by at least one of: fuel after-injection into the internal combustion engine; and by an introduction of a reagent substance into the exhaust gas area of the internal combustion engine.

5. A method according to claim 1, wherein an exhaust gas temperature actual value is measured upstream of the particle filter and a closed-loop control is conducted to a specified exhaust gas temperature set point.

6. A method according to claim 1, wherein the measurement for the at least one parameter is ascertained in a characteristic model.

7. A method according to claim 6, wherein a characteristic model takes into account at least one of: a measurement for an exhaust gas temperature actual value upstream of the particle filter; a measurement for an exhaust gas flow; and a measurement for an oxygen concentration in an exhaust gas.

8. A method according to claim 6, wherein a correction value to correct the characteristic model is ascertained from a comparison of a measurement for a particle filter temperature ascertained from the characteristic model and a measured particle filter temperature.

9. A device that operates a particle filter disposed in an exhaust gas area of an internal combustion engine, the device including at least one control device that heats the particle filter for regeneration by manipulating an exhaust gas temperature upstream of the particle filter, wherein the exhaust gas temperature is brought to a specified exhaust gas temperature set point selected as one of a step progression comprising intermittent changes to the exhaust gas temperature set point and a continuous progression comprising continuous changes to the exhaust gas temperature set point, and wherein the exhaust gas temperature set point is a function dependent upon at least one parameter of the particle filter during the regeneration.

10. A device according to claim 9, further including a temperature sensor to acquire an exhaust gas temperature actual value upstream the particle filter.

* * * * *